US012084893B2

(12) United States Patent
Wheatland

(10) Patent No.: US 12,084,893 B2
(45) Date of Patent: Sep. 10, 2024

(54) GATE LATCH

(71) Applicant: ASSA ABLOY Americas Residential Inc., New Haven, CT (US)

(72) Inventor: Graham Wheatland, Vail, AZ (US)

(73) Assignee: ASSA ABLOY Americas Residential Inc., New Haven, CT (US)

(*) Notice: Subject to any disclaimer, the term of this patent is extended or adjusted under 35 U.S.C. 154(b) by 9 days.

(21) Appl. No.: 17/500,103

(22) Filed: Oct. 13, 2021

(65) Prior Publication Data

US 2022/0112744 A1 Apr. 14, 2022

Related U.S. Application Data

(60) Provisional application No. 63/091,155, filed on Oct. 13, 2020.

(51) Int. Cl.

*E05B 63/04* (2006.01)
*E05B 15/04* (2006.01)
*E05B 55/00* (2006.01)
*E05B 47/00* (2006.01)

(52) U.S. Cl.

CPC ............ *E05B 63/044* (2013.01); *E05B 15/04* (2013.01); *E05B 55/005* (2013.01); *E05B 2047/0088* (2013.01); *E05Y 2900/40* (2013.01)

(58) Field of Classification Search

CPC ...... E05B 63/044; E05B 15/04; E05B 55/005; E05B 2047/0088; E05B 63/04; E05Y 2900/40
USPC .......................................................... 292/244
See application file for complete search history.

(56) References Cited

U.S. PATENT DOCUMENTS 3,897,093 A * 7/1975 Wiczer ................ E05B 47/0002 292/144
4,798,065 A * 1/1989 DeForrest, Sr. ...... E05B 63/044 70/462
6,808,212 B1 * 10/2004 Hardee ................ E05B 67/383 292/341.15
8,561,440 B1 * 10/2013 Sierra ..................... E05B 13/10 70/56
9,470,019 B1 * 10/2016 Davis ...................... E05B 63/04
2004/0251694 A1 * 12/2004 Gorski ................ E05B 65/0007 292/175
2017/0198501 A1 * 7/2017 Baker ................ E05B 65/0007

(Continued)

*Primary Examiner* — Kristina R Fulton
*Assistant Examiner* — James Edward Ignaczewski
(74) *Attorney, Agent, or Firm* — Merchant & Gould P.C.

(57) ABSTRACT

A latch includes a housing that has a first side and a second side. The latch includes a bolt locking assembly that is positioned at least partially within the housing. The bolt locking assembly includes a bolt movable between first and second positions relative to at least one of the first and second sides of the housing. The bolt is positionable to selectively extend from either the first side or the second of the housing. The latch includes a first handing configuration and a second handing configuration, where the first handing configuration corresponds to the first position and the second handing configuration corresponds to the second position. Changing between the first handing configuration and the second handing configuration requires moving the bolt locking assembly to a disengaged position and applying the external force to the bolt to move the bolt between the first and second positions.

20 Claims, 14 Drawing Sheets

(56) References Cited

U.S. PATENT DOCUMENTS

| | | | | |
|---|---|---|---|---|
| 2019/0234112 | A1* | 8/2019 | Hong | E05B 63/044 |
| 2020/0040605 | A1 | 2/2020 | Farag | |

* cited by examiner

GATE LATCH

CROSS-REFERENCE TO RELATED APPLICATION

This application claims the benefit of U.S. Provisional Application Ser. No. 63/091,155, filed Oct. 13, 2020, the disclosure of which is hereby incorporated by reference in its entirety.

BACKGROUND

When considering a latch for a hinged barrier for a passageway (e.g., a door, gate, etc.), users have traditionally had to consider the handing of the barrier before choosing a latch. Handing of a barrier refers to the side of the barrier where the hinge is positioned with respect to the user (e.g., a left-handed barrier or a right-handed barrier). Handing has had to be considered because latch hardware is typically provided in either a left-handed configuration or an opposite right-handed configuration. This is specifically true for a locking gate latch having a lock cylinder, where the lock cylinder has a specific direction of rotation for both locking and unlocking the gate latch (i.e., different in either left- or right-handed latches). Therefore, the user must make a decision when acquiring latch hardware, often leading to confusion and frustration.

Therefore, improvements are desired.

SUMMARY

The present disclosure relates generally to barrier latches. In one possible configuration, and by non-limiting example, a gate latch that includes a field-handable bolt without disassembly of the latch is disclosed.

In one example of the present disclosure, a latch is disclosed. The latch includes a housing that has a first side and a second side. The latch includes a bolt assembly positioned at least partially within the housing. The bolt assembly includes a bolt that is movable between a first position and a second position. The latch includes a bolt locking assembly. The bolt locking assembly has an engaged position and a disengaged position. When in the engaged position, the bolt locking assembly interfaces with the bolt to prevent movement of the bolt between the first and second positions and, when in the disengaged position, the bolt locking assembly allows movement of the bolt. The bolt locking assembly is linearly movable relative to the housing between the engaged and disengaged positions and biased toward the engaged position by at least one bolt locking assembly spring. The latch includes a bolt spring in contact with the bolt, and the bolt spring biases the bolt toward at least one of the first position and the second position. The latch includes a bolt movement assembly including a locking cylinder mechanism movable between a locked position and an unlocked position. The locking cylinder mechanism is connected to the bolt locking assembly, and the locking cylinder mechanism is accessible from the first side of the housing. The bolt movement assembly includes a control connected to the bolt locking assembly. The control is accessible from the second side of the housing, and, when actuated, the control moves the bolt locking assembly between the engaged and disengaged positions. The bolt movement assembly includes a cam connected to the locking cylinder mechanism. The cam interfaces with an inner surface of the bolt locking assembly and is configured to rotate with the locking cylinder mechanism. When the cam engages with the inner surface of the bolt locking assembly, the cam moves the bolt locking assembly to the disengaged position by moving the bolt locking assembly against the bias of the at least one bolt locking assembly spring. When the bolt locking mechanism is disengaged from the bolt, the bolt is moved initially only by an external force between the first position and the second position, and the movement of the bolt is partially assisted by the bolt spring toward one of the first or second position of the bolt.

In another example of the present disclosure, a method of operating a latch is disclosed. The method includes providing a latch that includes a bolt movable between a first position and a second position. The latch includes a locking cylinder mechanism movable between a locked position and an unlocked position. The locking cylinder mechanism is connected to the bolt and the locking cylinder mechanism has a keyhole. The latch includes a first handing configuration and a second handing configuration. The first handing configuration corresponds to the first position of the bolt and the second handing configuration corresponds to the second position of the bolt. The method includes mounting the latch to an interior side of a gate and positioning the locking cylinder mechanism so that the keyhole is accessible from an exterior side of the gate. The method includes mounting a receiving mechanism to a surface adjacent the latch. The receiving mechanism is aligned with the bolt so that the receiving mechanism is configured to receive and retain the bolt when the locking cylinder mechanism is in the locked position. The method includes choosing the first or second handing configuration of the bolt by applying the external force to the bolt to move the bolt between the first and second positions so that the locked position of the locking cylinder mechanism positions the bolt within the receiving mechanism.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
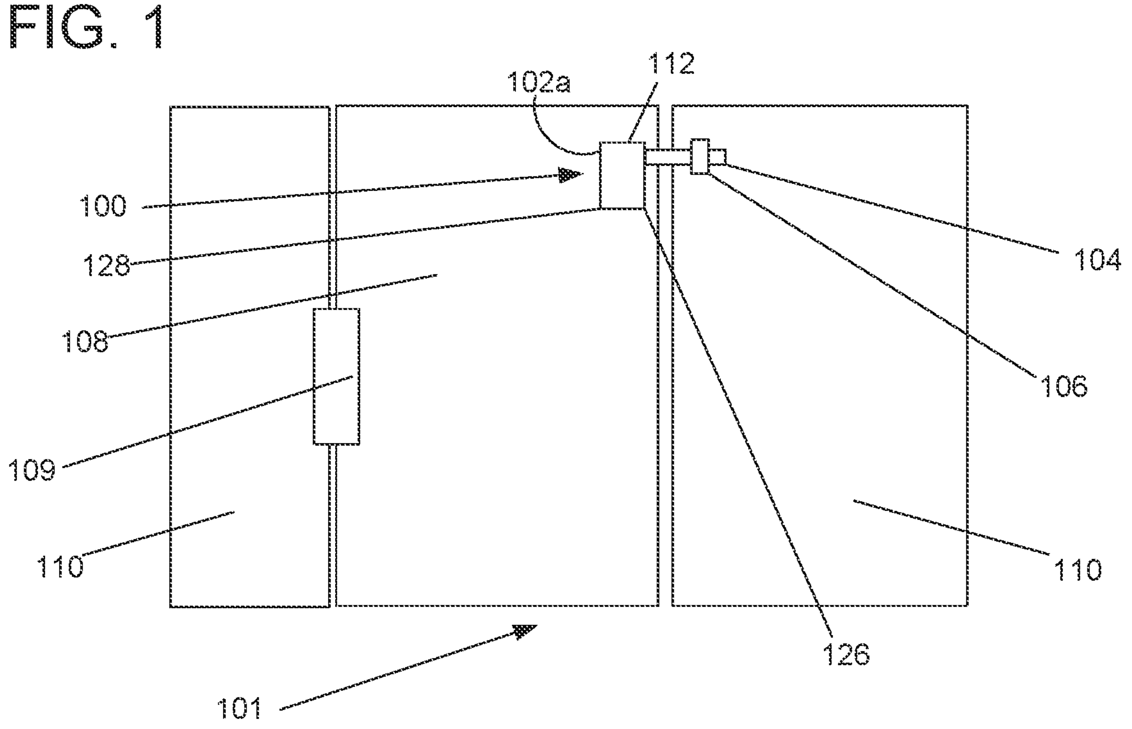
FIG. 1 is a front view of a latch mounted to a gate, in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of a gate latch set with a field-handable latch using a different internal mechanism from the present disclosure, is described in U.S. Patent Publication No. 2019/0234112, the disclosure of which is hereby incorporated by reference in its entirety.

The gate latch disclosed herein includes a plurality of advantages. The gate latch provides a bolt that can be positionable so that the gate latch can be handed in a left-handed configuration or a right-handed configuration without having to disassemble or invert the gate latch. This provides a simple handing process. Further, the gate latch includes a control which allows the gate to be opened from the locked position to the unlocked position from the interior of the gate without needing to use a key.

The gate latch disclosed herein is configured to be mounted to a gate and used with a gate. However, it is considered within the scope of the present disclosure, that the gate latch can be used in connection with any barrier that, when in a closed position, at least partially obstructs an opening (e.g., a door, a window, etc.). The gate latch disclosed herein can be utilized in a variety of different applications. For example, the gate latch can be used on a gate positioned within a fence in a residential environment, such as on a backyard gate of a home with a fenced-in backyard. The gate latch is configured to have a main assembly mounted to the interior of the gate and, at the exterior of the gate, a locking cylinder mechanism can be accessible.

FIG. 1 shows a movable gate 108 positionable within a passageway 101 in a fence 110. The gate 108 includes a hinge 109 connected to the fence 110 and the gate 108 is movable via the hinge 109 to be selectively positioned to block the passageway 101. The gate 108 is shown to include a latch 100 to selectively lock the gate 108 by fixing the gate 108 relative to the fence 110. The latch 100 is shown in a locked position in FIG. 1 and an unlocked position in FIG. 2. A bolt 104 is shown in a housing 112 of an interior assembly 102*a* of the latch 100, and the housing has first and second sides 126, 128.

FIG. 1 shows the bolt 104 extending outwardly from the first side 126 of the housing 112 in a first position that corresponds to the locked position of the latch 100. The bolt 104 is shown extending into a receiving mechanism 106 on the fence 110.

Figure 2:
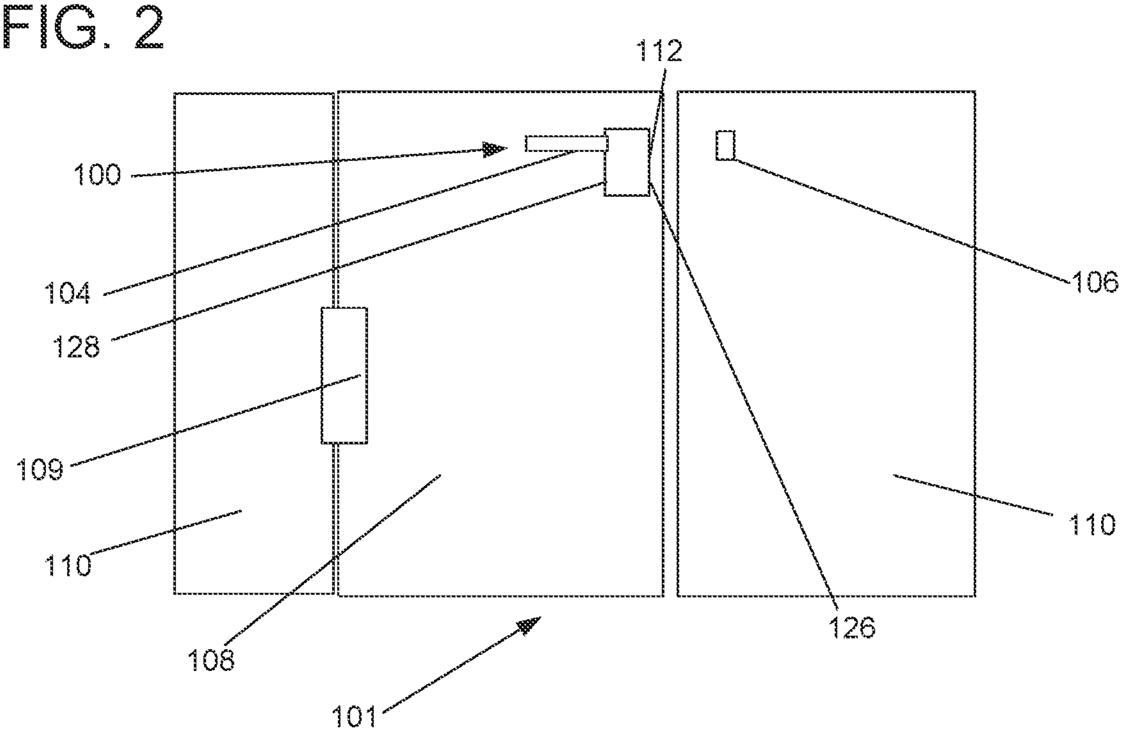
FIG. 2 is another front view of the latch of FIG. 1 mounted to a gate.

FIG. 2 shows the bolt 104 extending outwardly from the second side 128 of the housing 112 in a second position that corresponds to the unlocked position of the latch 100.

In some examples, the latch 100 can be handed in either right or left configurations. When handed in the opposite configuration then what is shown in FIGS. 1 and 2 (i.e., the hinge 109 is positioned on the opposite side of the gate 108), the first position of the bolt 104 corresponds to the unlocked position of the latch 100, while the second position of the bolt 104 corresponds to the locked position of the latch 100.

In some examples, the interior assembly 102*a* and bolt 104 are mounted to an inside of the gate 108. Accordingly, the receiving mechanism 106 can be mounted to, or within a gate jamb. In some examples, the gate jamb is a post or other portion of the fence 110 or other barrier adjacent the gate 108. The term “outside” is broadly used to mean an area outside the gate 108, and “inside” is broadly used to denote an area inside the gate 108. In some examples, from the outside of the gate 108, a keyhole 140*a* of the latch 100 is accessible into which a key 146 can be inserted to operate a locking cylinder mechanism 140 of the latch 100. Additionally, in some examples, the bolt 104 of the latch 100 can be operated (e.g. actuated between the first and second positions) without a key. In some examples, the interior assembly 102*a* can be mounted to the gate jamb and the receiving mechanism 106 can be mounted to the gate 108.

Figure 3:
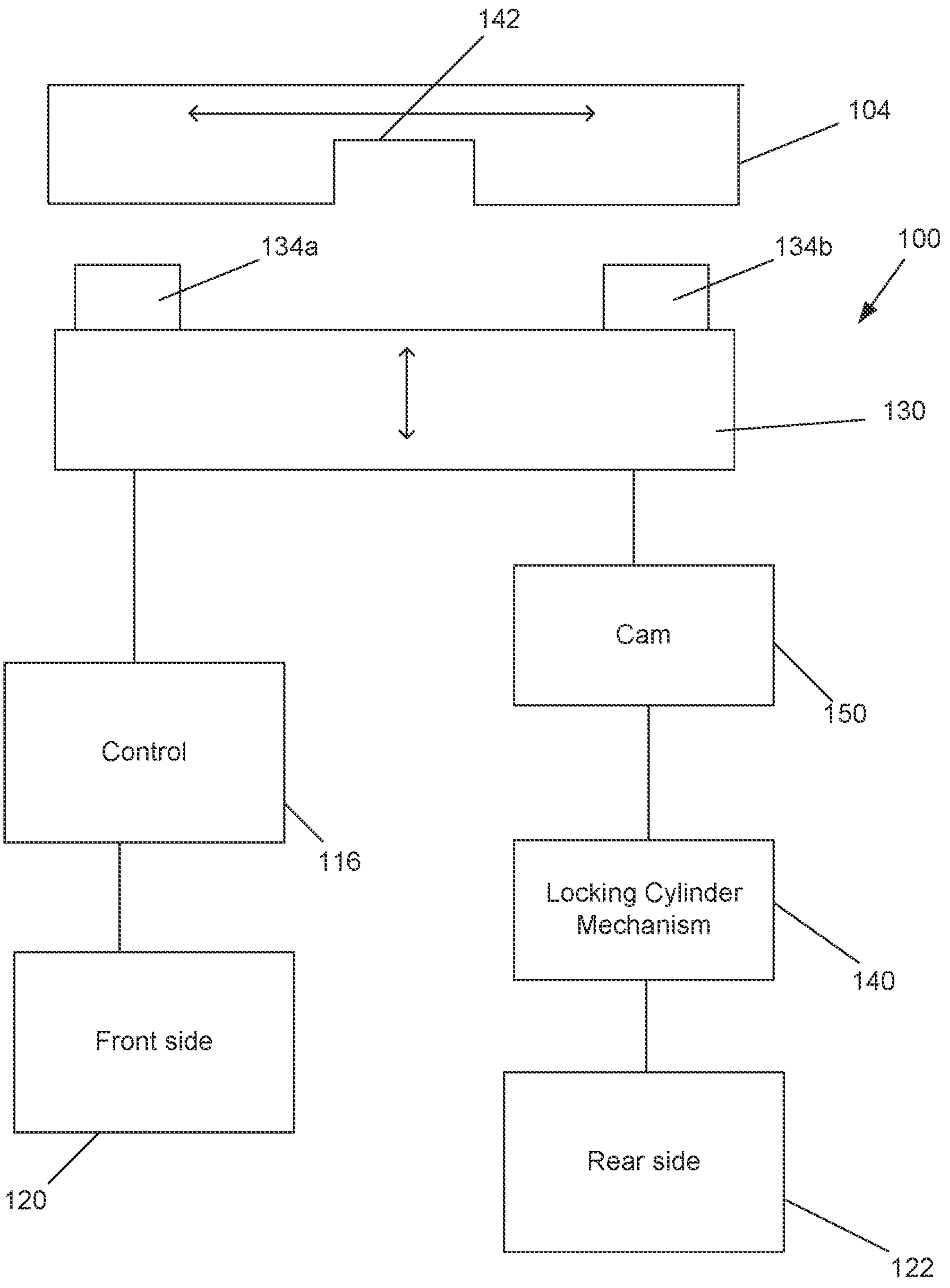
FIG. 3 is a schematic view of the latch of FIG. 1.

Referring to FIG. 3, a schematic view of the latch 100 is shown. The latch 100 includes a front side 120, a rear side 122, a control 116, the locking cylinder mechanism 140, a cam 150, a bolt locking assembly 130, and the bolt 104.

In some examples, the bolt 104 is movable longitudinally, as indicated by a double-sided arrow. In some examples, the bolt 104 can include a notch 142. The notch 142 can directly interface with the bolt locking assembly 130 to hold the bolt 104 in place. The notch 142 can be configured to interface with first and second lock portions 134*a*, 134*b* of the bolt locking assembly 130 which extend upwardly. It is considered within the scope of the present disclosure that the bolt locking assembly 130 can include notches and the bolt 104 can include a lock portion. The first lock portion 134*a* corresponds with the first locking position (i.e., the bolt 104 extending through the first side 126 of the housing 112) and the second lock portion 134*b* corresponds with the second locking position (i.e., the bolt 104 extending through the second side 128 of the housing 112).

The bolt locking assembly 130 is disengageable from the bolt 104 by the control 116 or the locking cylinder mechanism 140 to allow the bolt 104 to be manually moved to either side 126, 128 of the housing 112. For example, if the operator is at the rear side 122 (i.e., outside) of the gate 108, the locking cylinder mechanism 140 is used to disengage the bolt locking assembly 130 from the bolt 104. If the operator is at the front side 120 (i.e., inside) of the gate 108, the control 116 is used to disengage the bolt locking assembly 130 from the bolt 104.

Figure 4:
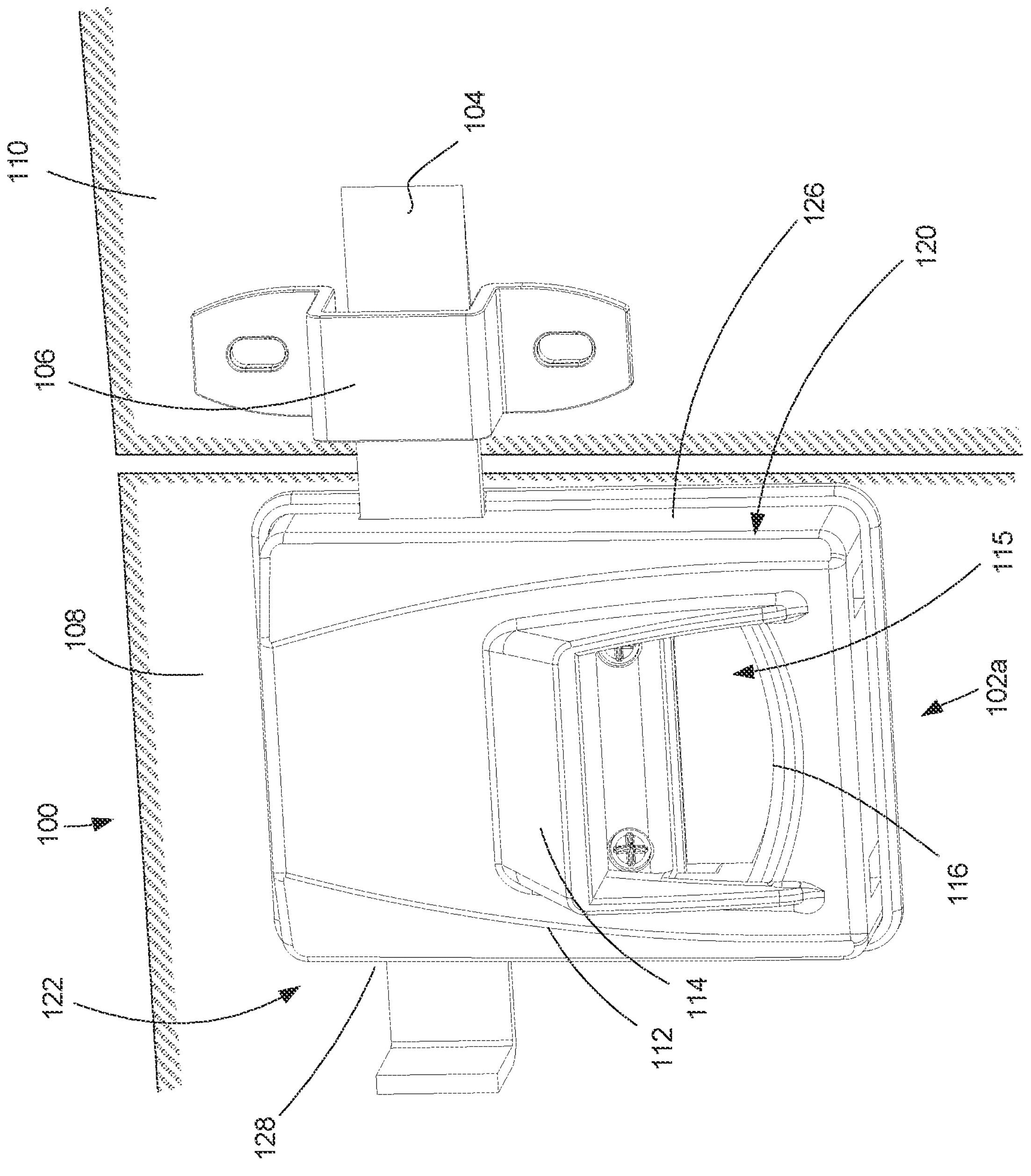
FIG. 4 is a front perspective view of the latch of FIG. 3 mounted to a gate.

FIG. 4 shows a perspective view of the front side 120 of the latch 100 in the locked position. The latch 100 includes the interior assembly 102*a* and the bolt 104 at least partially within the interior assembly 102*a* so as to be movable longitudinally. The latch 100 is shown mounted to the gate 108 and the fence 110 is shown including the receiving mechanism 106. The receiving mechanism 106 is shown as receiving the bolt 104 and keeping the latch in the locked position to prevent relative movement between the gate 108 and fence 110. The control 116 is accessible from the front side 120 of the housing 112. The front side 120 of the housing 112 would typically be positioned on the inside of the gate 108 or other hinged barrier.

The control 116 disengages the bolt 104 to allow for the bolt to be movable longitudinally between the first and second positions. Once disengaged, the bolt 104 can be manually pushed between the first locking position (i.e., the bolt 104 extended through the first side 126 of the housing 112) and the second locking position (i.e., the bolt 104 being extended through the second side 128 of the housing 112).

Figure 5:
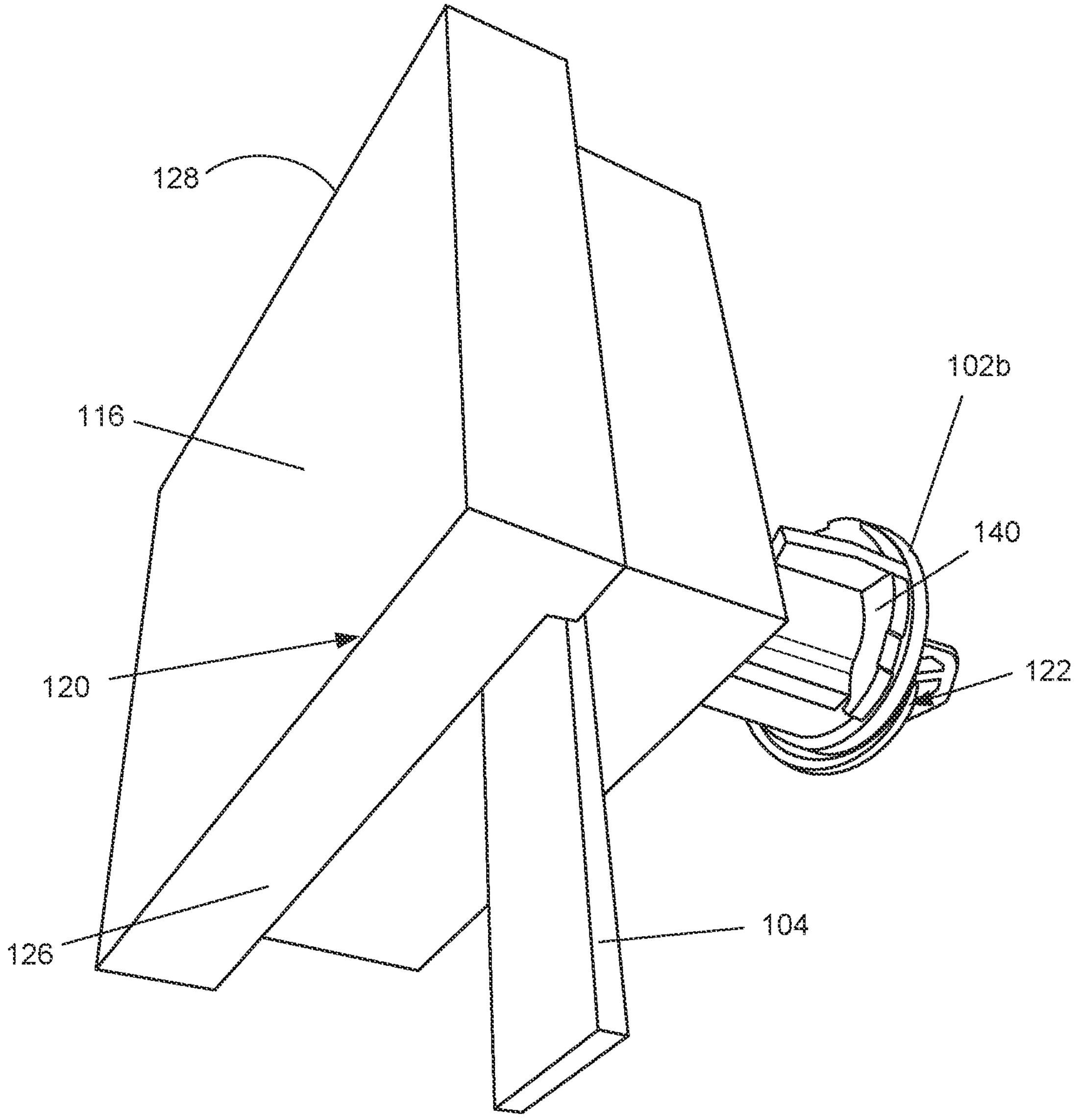
FIG. 5 is a side perspective view of the latch of FIG. 3.

Referring to FIG. 5, a perspective view of the latch 100 is shown. The control 116 is shown as a schematic block on the front side 120 of the latch 100. A portion of the locking cylinder mechanism 140 is accessible via the rear side 122 of the latch 100. An exterior assembly 102*b*, specifically the locking cylinder mechanism 140, is what a user would have access to when using the latch 100 from the rear side 122.

Figure 6:
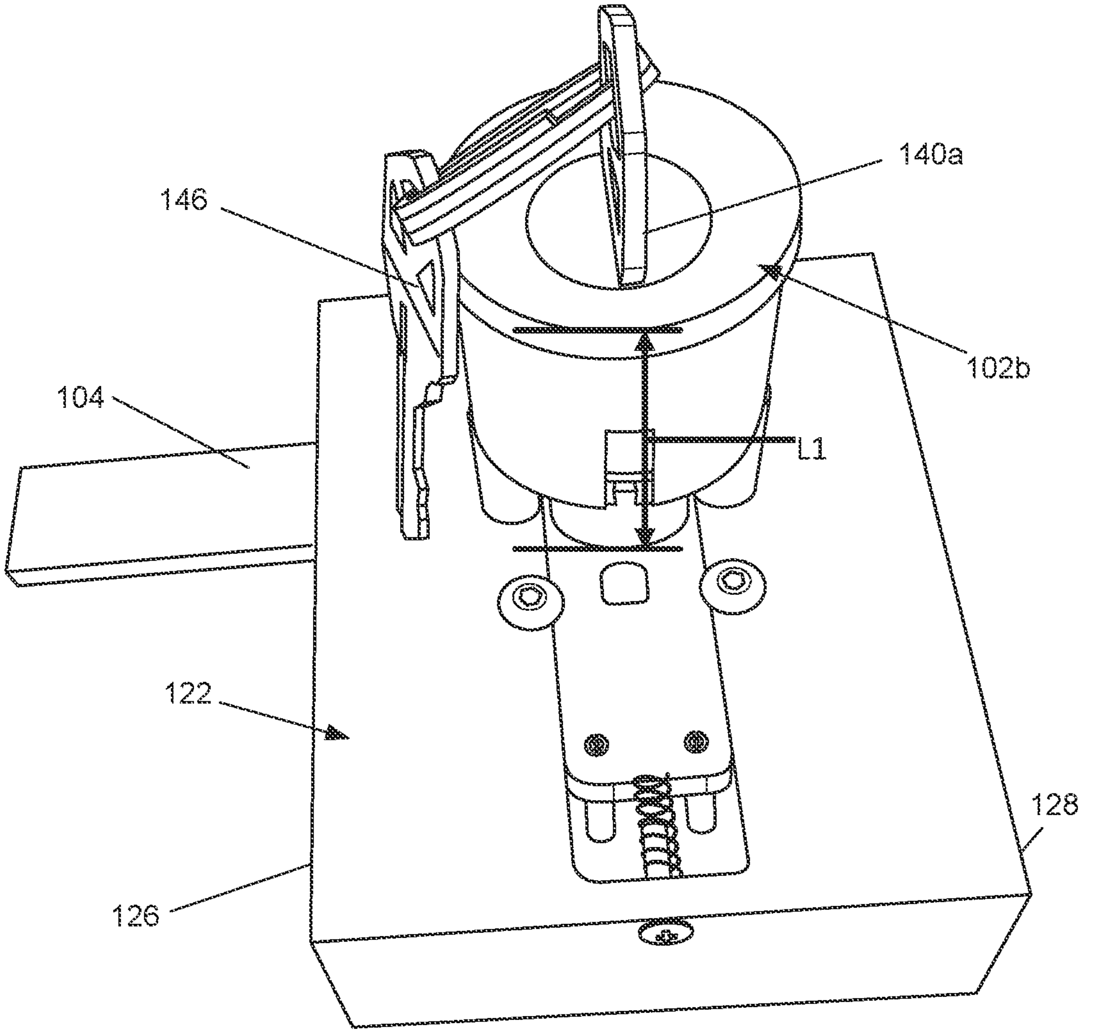
FIG. 6 is a bottom rear perspective view of the latch of FIG. 3 highlighting a second side of the latch.
Figure 7:
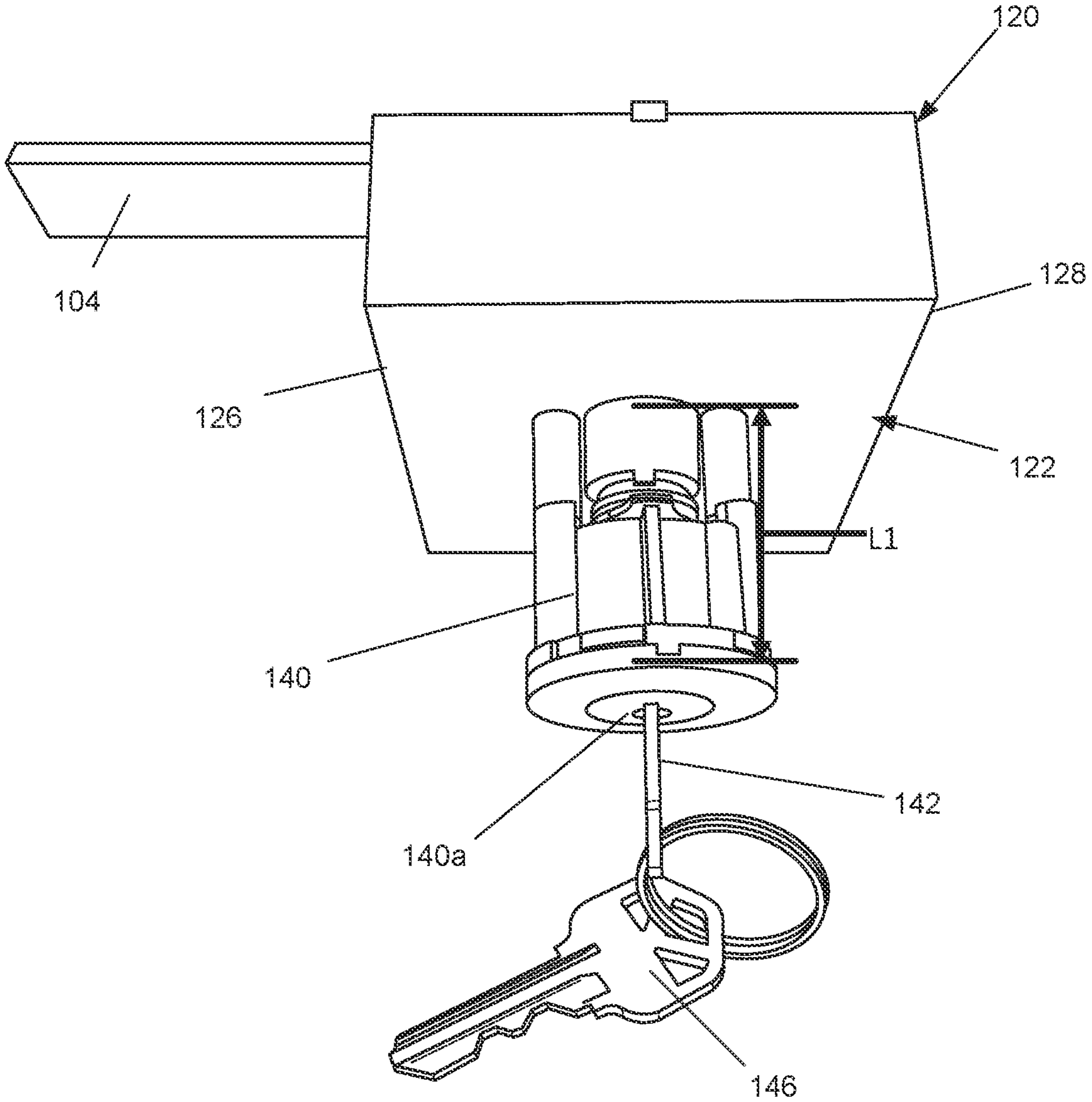
FIG. 7 is a top rear perspective view of the latch of FIG. 3 highlighting the second side of the latch.

Referring to FIGS. 6 and 7, a perspective rear view of the latch 100 is shown. The locking cylinder mechanism 140 is used to disengage the bolt locking assembly 130 from the bolt 104. The locking cylinder mechanism 140 extends outwardly from the latch 100 and can define a length L1 which can extend through a hole in the gate 108 to provide access to the locking cylinder mechanism 140 from the exterior of the gate 108.

The locking cylinder mechanism 140 requires the key 146 to unlock the latch 100 from the rear side 122. The locking cylinder mechanism 140 is movable between a locked position and an unlocked position, each corresponding to the locked and unlocked positions of the latch 100, respectively. The locking cylinder mechanism 140 includes the keyhole 140*a* into which the key 146 can be inserted. An example of a locking cylinder mechanism is described in U.S. Patent Publication No. 2020/0040605, the disclosure of which is hereby incorporated by reference in its entirety.

Figure 8:
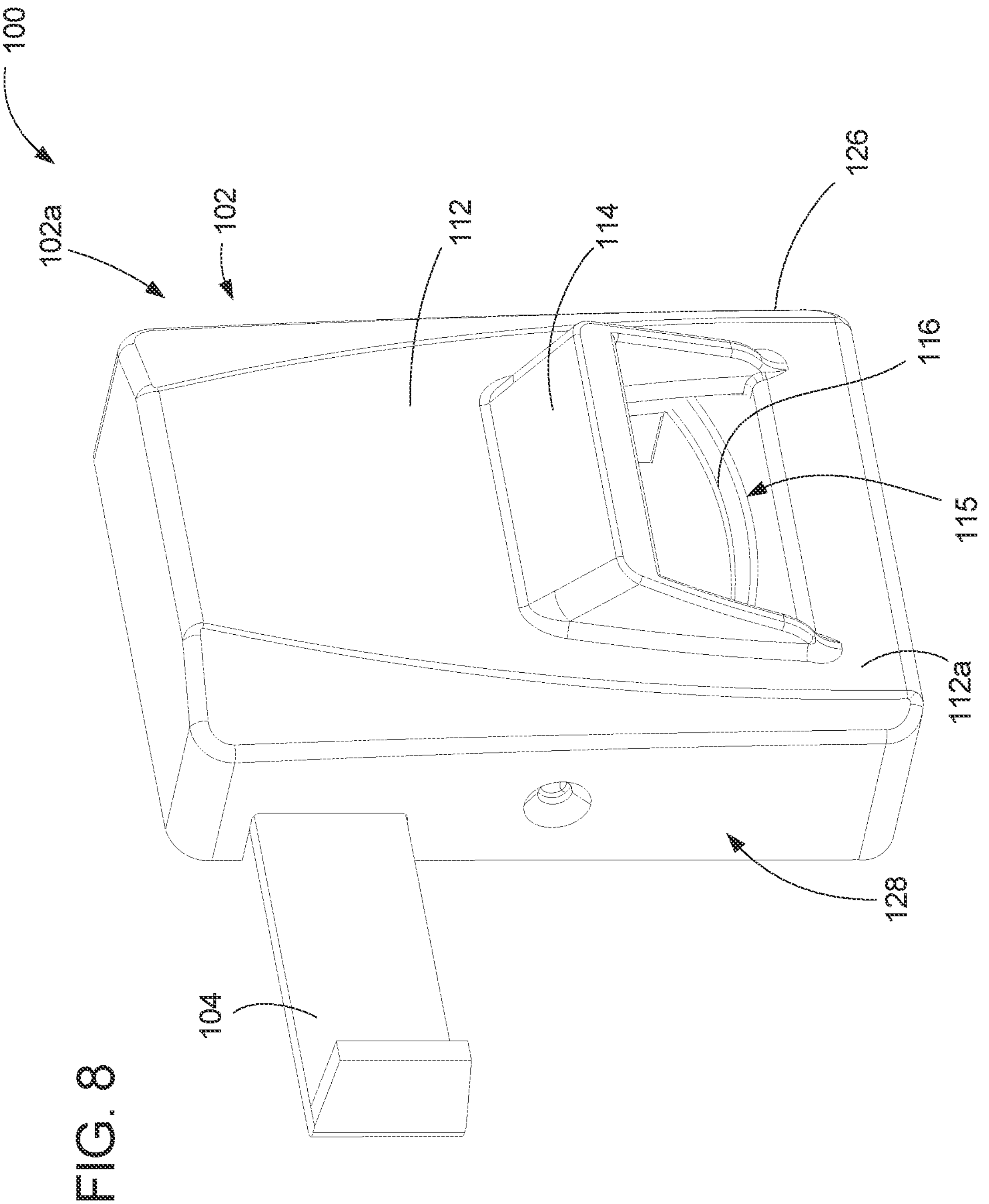
FIG. 8 is another front perspective view the latch of FIG. 3.

FIG. 8 shows a perspective view of a latch 100 with the bolt 104 in the second position, extended through the second side 128 of the housing 112. An example of the interior assembly 102*a* is shown disposed in a housing cover 112*a*. The housing cover 112*a* can have a variety of different shapes and sizes. In some examples, the housing cover 112*a* can be configured to match other trim types within a particular environment. In some examples, the housing cover 112*a* can include ornamental features. In the depicted example, the housing cover 112*a* includes an aperture 115. As shown, the control 116 is positioned inside of the aperture 115. The control 116 can be covered at least in part by a shroud 114 located on the housing cover 112*a*. In some examples, the shroud 114 can shield the aperture 115 from water ingress.

Through the aperture 115 of the housing cover 112*a*, a user can access the control 116. In the configuration depicted in FIG. 8, the bolt 104 is positioned in the second position, extending outwardly from the second side 128 of the housing 112. Conversely, in the configuration depicted in FIG. 9, the bolt 104 is positioned in the first positon, extending outwardly from the first side 126 of the housing 112. Depending on the handing of the latch 100, one locking position will typically be configured to receive the bolt 104 with the receiving mechanism 106 and hold the gate 108 or other hinged barrier in a locked position, and the other locking position will correspond with an unlocked gate 108 or other hinged barrier.

Figure 9:
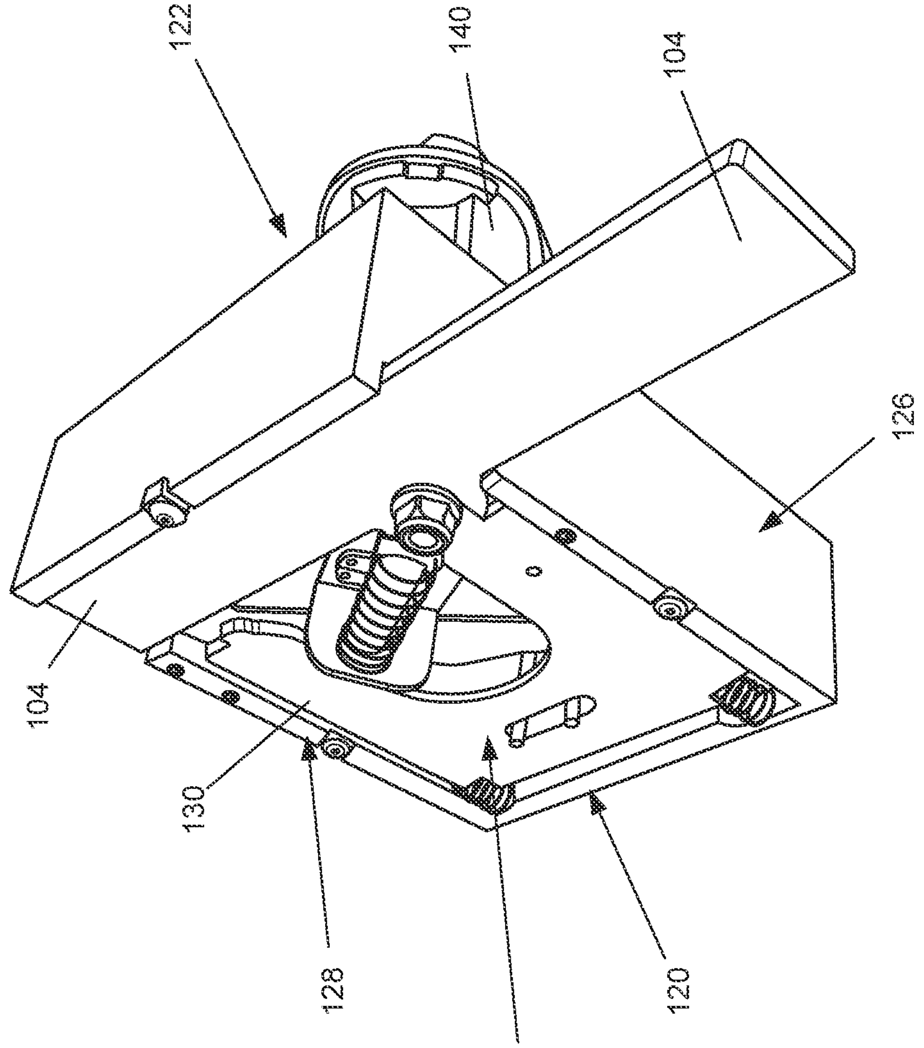
FIG. 9 is another front side perspective view the latch of FIG. 3 with a housing cover removed.
Figure 10:
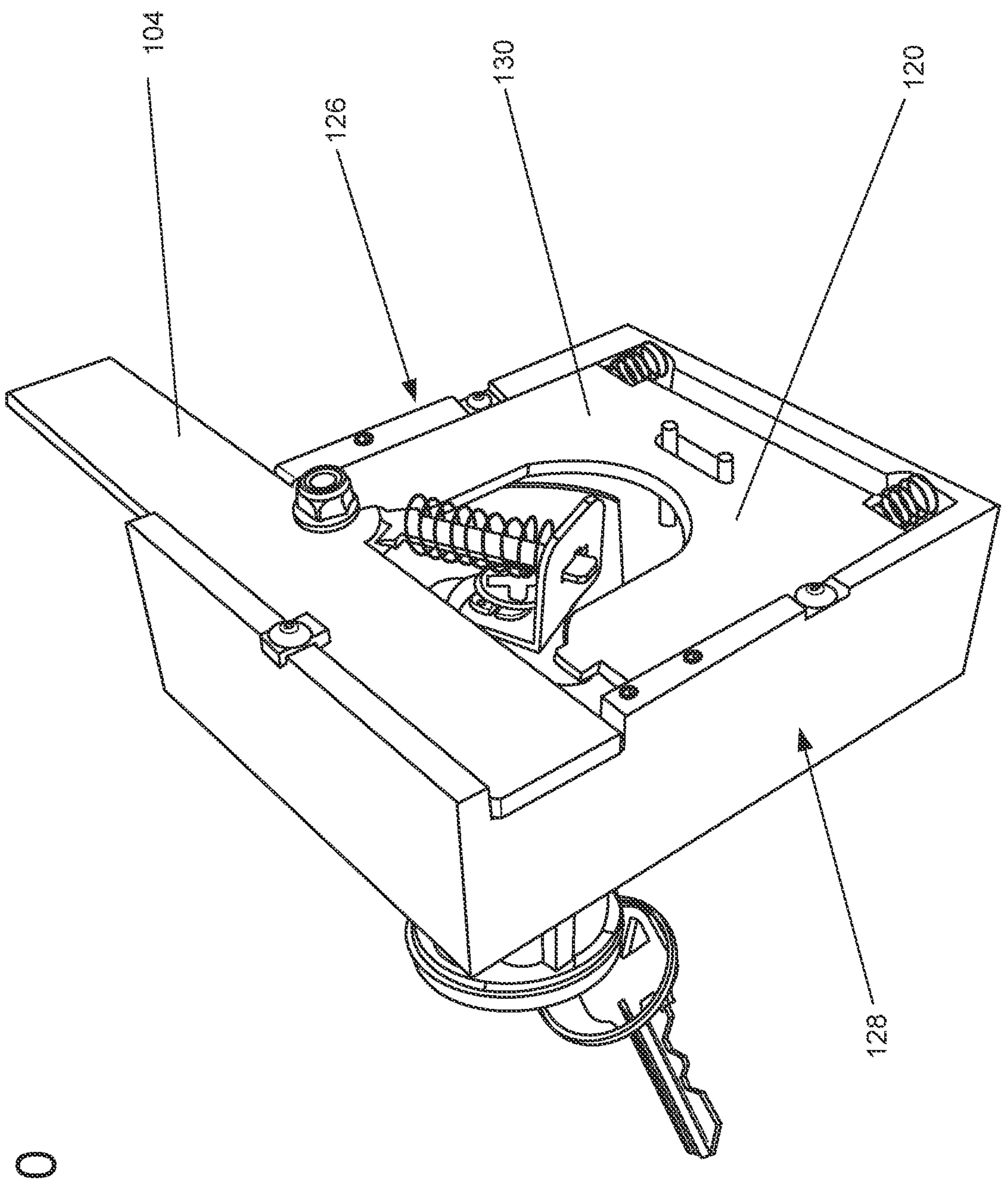
FIG. 10 is another front side perspective view of the latch of FIG. 9 with a housing cover removed.

FIGS. 9 and 10 show perspective views of the latch 100 from the front side 120 with the housing cover 112*a* removed. FIGS. 9 and 10 show the bolt 104 extending outwardly through the first side 126 in the first position. Due to the configuration of the latch 100, the latch 100 can be handed without having to disassemble the latch 100. This eases the installation process for the user.

Figure 11:
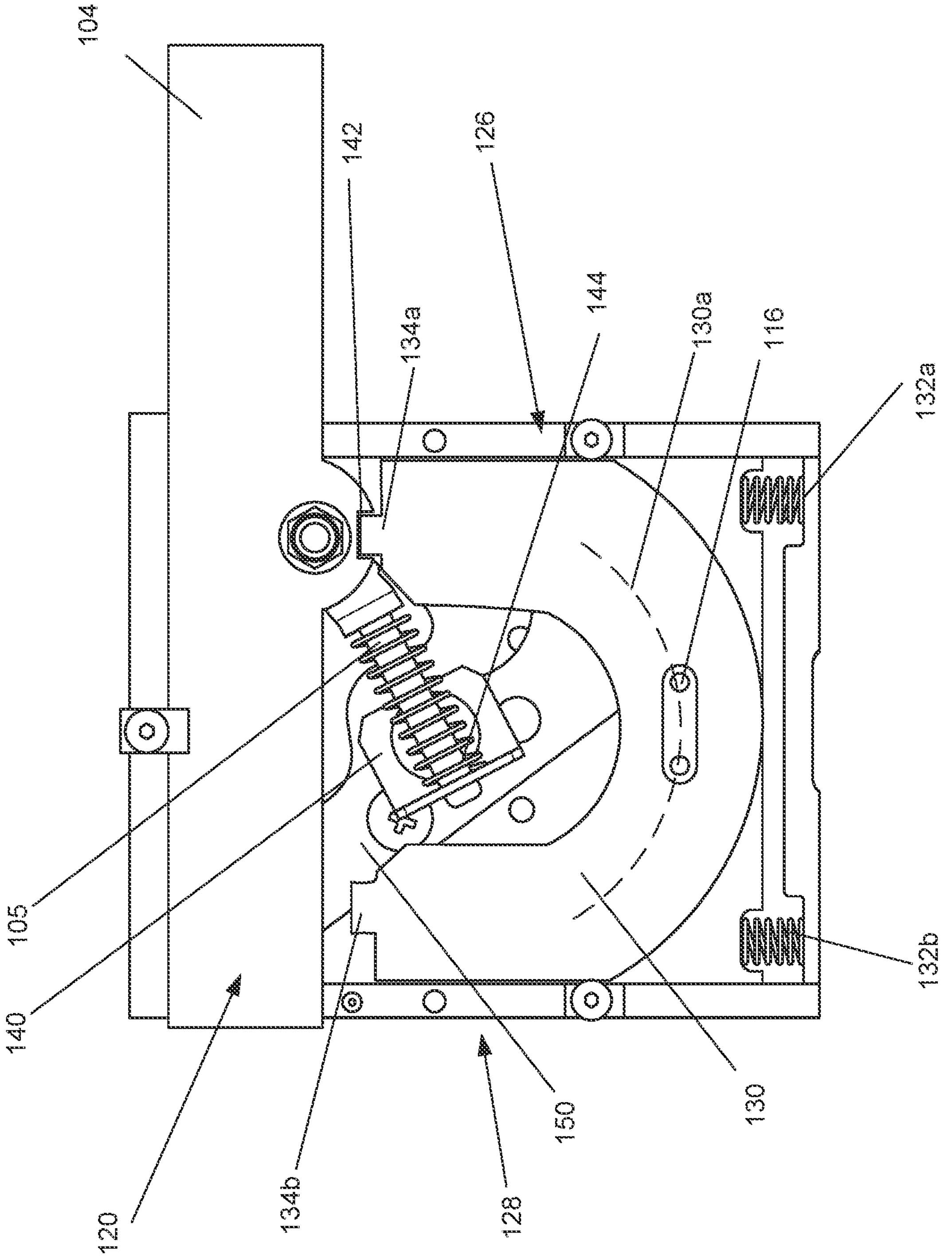
FIG. 11 is a front side perspective view of the latch of FIG. 9 with a housing cover removed and a bolt in a first position.

FIG. 11 shows the front side 120 of the interior assembly 102*a* with the housing cover 112*a* removed. The interior assembly 102*a* includes the bolt locking assembly 130 with the first and the second lock portions 134*a*, 134*b*, an inner surface 130*a*, first and second bolt locking assembly springs 132*a*, 132*b*, the cam 150, the notch 142 on the bolt 104, and a bolt spring 144.

The interior assembly 102*a* shows the bolt 104 positioned partially within the housing 112. The bolt 104 is shown in the first position. The bolt locking assembly 130 is shown interfacing with the bolt 104 in order to secure the bolt 104 in place (i.e., prevent longitudinal movement of the bolt 104). In order to hold the bolt 104 in place, the bolt locking assembly 130 and the bolt 104 are configured mate with one another to prevent relative movement.

The notch 142 of the bolt 104 interfaces with first and second lock portions 134*a*, 134*b* of the bolt locking assembly 130. The bolt locking assembly 130 is movable relative to the housing 112 between an engaged position (shown in FIG. 11) and a disengaged position (shown in FIG. 12).

When the bolt locking assembly 130 is in the engaged position, the first or second lock portion 134*a*, 134*b* interfaces with the bolt 104. When the bolt locking assembly 130 is in the engaged position, the bolt 104 is secured and cannot move from either the first position or the second position. The bolt locking assembly 130 is biased upwards by one or more bolt locking assembly springs 132*a*, 132*b*. In the example shown in FIG. 11, there is a first bolt locking assembly spring 132*a* and a second bolt locking assembly spring 132*b*. In some examples, less than two bolt locking assembly springs 132*a*, 132*b* are used, and in some examples, more than two bolt locking assembly springs 132*a*, 132*b* are used. To allow movement of the bolt 104, the bolt locking assembly 130 must be moved downward against the bias of the bolt locking assembly springs 132*a*, 132*b*.

In order to move the bolt locking assembly 130 into the disengaged position, the locking cylinder mechanism 140 or the control 116 is used.

The locking cylinder mechanism 140 is configured to be attached to the cam 150, which rotates with the locking cylinder mechanism 140. In some examples, the cam 150 is symmetrical. The cam 150 being symmetrical allows for the locking cylinder mechanism 140 to be rotated in both the clockwise and counter clockwise directions to cause the cam 150 to disengage the bolt locking assembly 130 from the bolt 104. When the locking cylinder mechanism 140 is in the unlocked position, the cam 150 engages with the inner surface 130*a* of the bolt locking assembly 130 to move the bolt locking assembly 130 to the disengaged position, against the bias of the bolt locking assembly springs 132*a*, 132*b*. This disengages the bolt locking assembly 130 by moving one of the lock portions 134*a*, 134*b* from the notch 142 of the bolt 104. Once removed from the notch 142, the bolt 104 can receive an external force (i.e., be moved manually) between the first and second positions. When the locking cylinder mechanism 140 is in the locked position, the cam 150 is not engaged with the bolt locking assembly 130, and the bolt locking assembly 130 remains engaged with the bolt 104 preventing movement of the bolt 104.

When the key 146 is inserted into the locking cylinder mechanism 140 and rotated, the locking cylinder mechanism 140 is moved between the locked and unlocked positions. Because the locking cylinder mechanism 140 is connected to the bolt 104 via a linkage 105, the rotation of the locking cylinder mechanism 140 via the key 140 moves the bolt 104 longitudinally between the first and second positions.

When the locking cylinder mechanism 140 is in the unlocked position and the cam 150 is rotated to force the bolt locking assembly 130 to the disengaged position away from the bolt 104, the locking cylinder mechanism 140 is connected to the bolt 104 via the linkage 105, the rotation of the locking cylinder mechanism 140 via the key 146 moves the bolt 104 longitudinally between the first and second positions. Depending on whether the receiving mechanism 106 is on the first or the second side 126, 128 of the housing 112, the bolt 104 can be unlocked by moving the bolt 104 from the first position to the second position or vice versa to unlock the gate 108.

The bolt 104, when disengaged from the bolt locking assembly 130, can be driven between the first and second positions manually by the user. In some examples, the bolt 104 is partially assisted by the bolt spring 144 as the bolt 104 is moved. The bolt spring 144 is part of the linkage 105 and contacts the bolt 104. The bolt spring 144 biases the bolt 104 toward either the first position or the second position. When manually moving the bolt 104, the bolt spring 144 assists movement of the bolt 104 when the bolt 104 is between the first and second positions, thus requiring manual movement to start movement of the bolt 104. Because the bolt 104 is not fully spring biased toward the first or second position, the user does not have to alter the spring (i.e., which position the springs biases the bolt toward) in order to hand the latch 104. This provides the benefit of partially assisting movement of the bolt 104, but it does not require the user to dissemble the latch 100 during handing. This eases installation and reduces potential errors in the handing process.

The control 116 can also be used to move the bolt locking assembly 130 downward to allow the bolt to be moved longitudinally. The control 116 (which can be a button, switch, lever, or like device) is used to disengage the bolt 104 from the bolt locking assembly 130. The control 116, when moved, directly moves the bolt locking assembly 130 to the disengaged position to disengage the bolt locking assembly 130 from the bolt 104. The bolt 104 is then manually movable by the user between the first and second positions to lock or unlock the gate 108.

With continued reference to FIG. 11, the latch 100 is shown in the first position extending out of the first side 126 of the housing 112 and engaged with the bolt 104. Specifically, the notch 142 of the bolt 104 is engaged with the first lock portion 134*a* of the bolt locking assembly 130. The cam 150 is in a position within the housing 112 in which it is not interfacing with the inner surface 130*a* of the bolt locking assembly 130.

Figure 12:
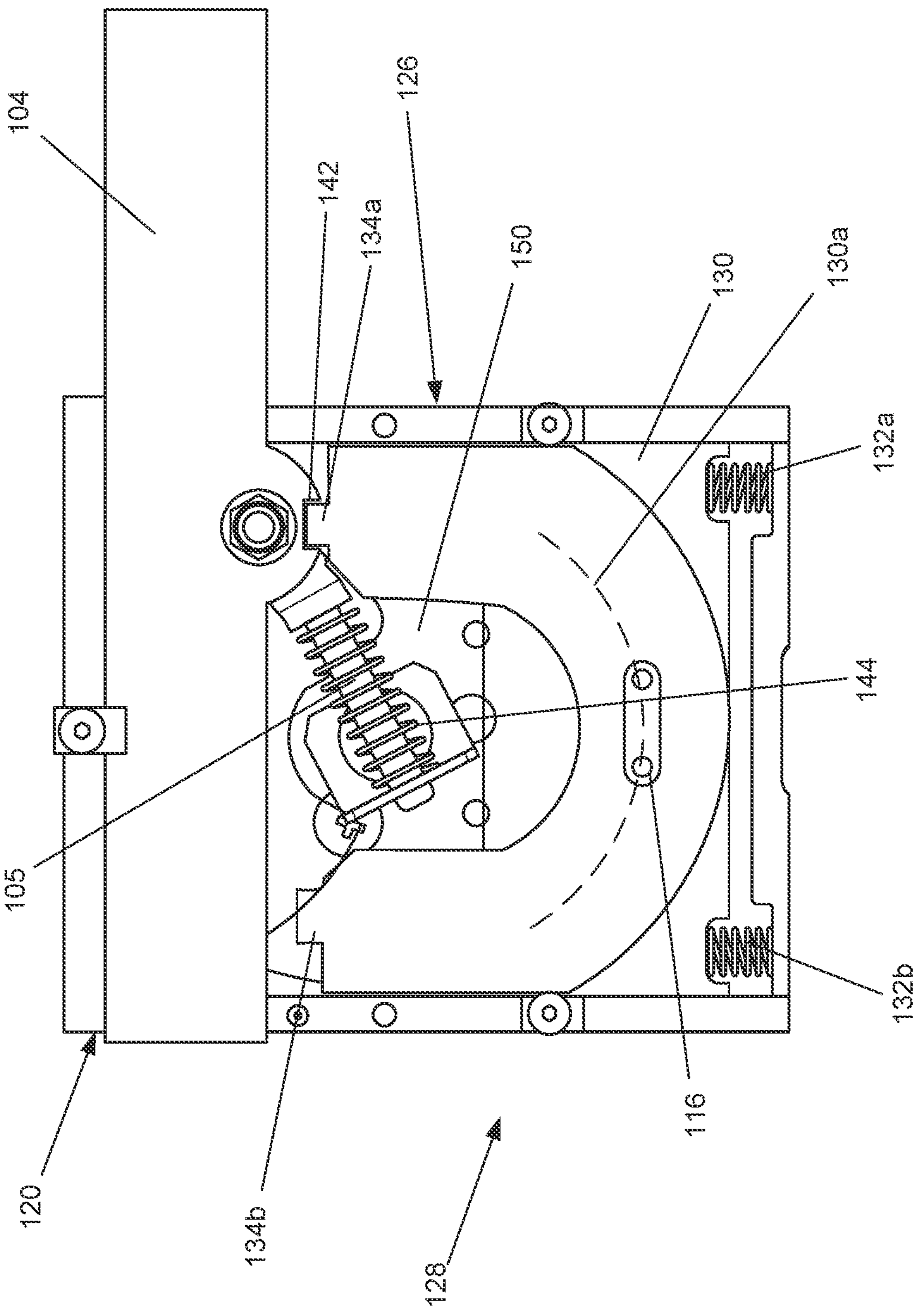
FIG. 12 is another front side perspective view of the latch of FIG. 9 with a housing cover removed and a bolt in the first position.

FIG. 12 shows the first and the second bolt locking assembly springs 132*a*, 132*b* compressed against their bias and the first lock portion 134*a* disengaged from the bolt 104 due to the cam 150 interfacing with the inner surface 130*a* of the bolt locking assembly 130 and forcing the bolt locking assembly 130 to the disengaged position.

Figure 13:
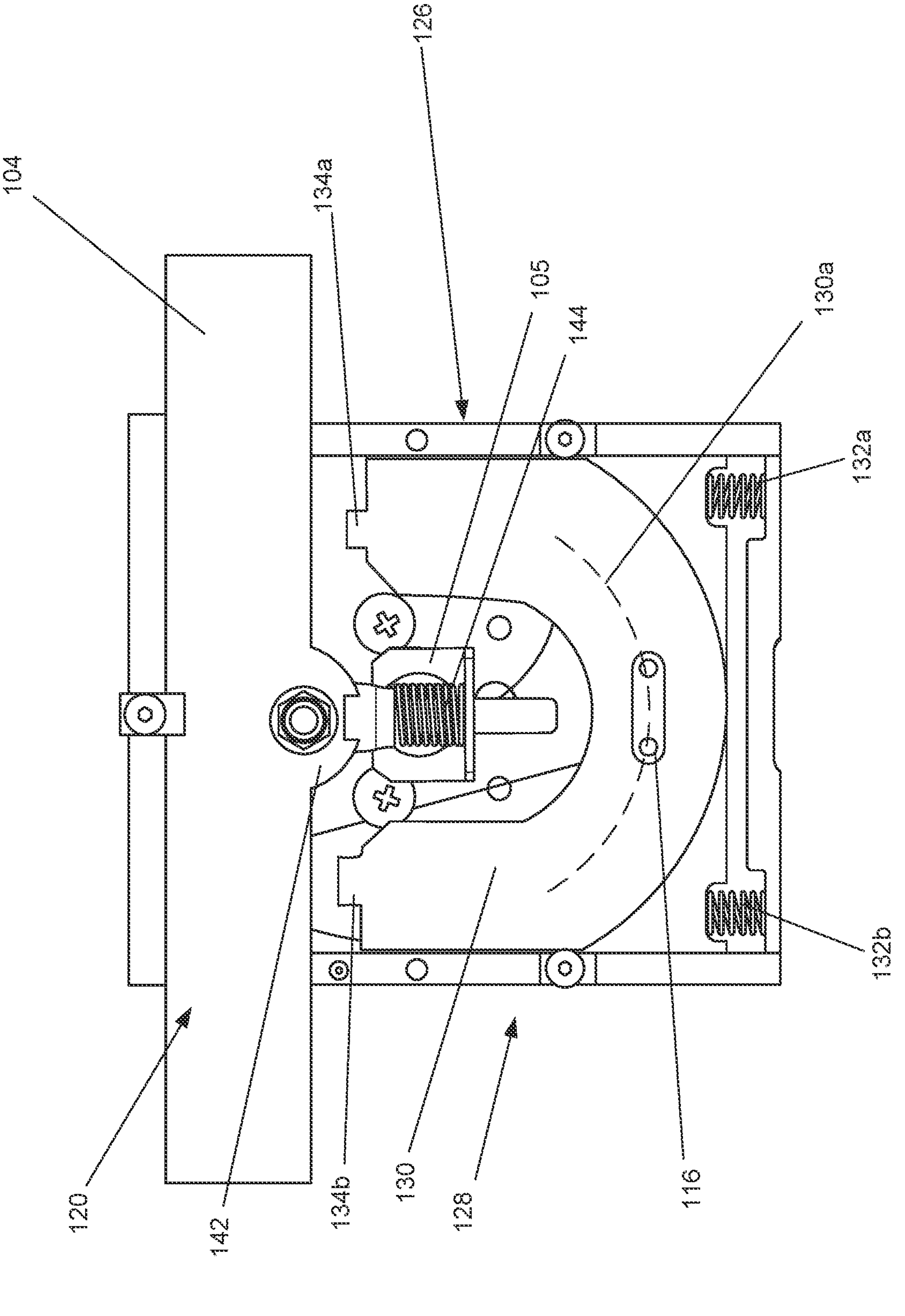
FIG. 13 is another front side perspective view of the latch of FIG. 9 with a housing cover removed and a bolt in a middle position.

FIG. 13 shows the bolt 104 at a midpoint of movement. The cam 150 is engaged with the inner surface 130*a* of the bolt locking assembly 130 and pressing against the bias of the bolt locking assembly springs 132*a*, 132*b*. The bolt spring 144 is shown compressed at a midpoint of the bolt's movement between the first and second position. After the midpoint, the bolt 104 is partially assisted by the bolt spring 144.

Figure 14:
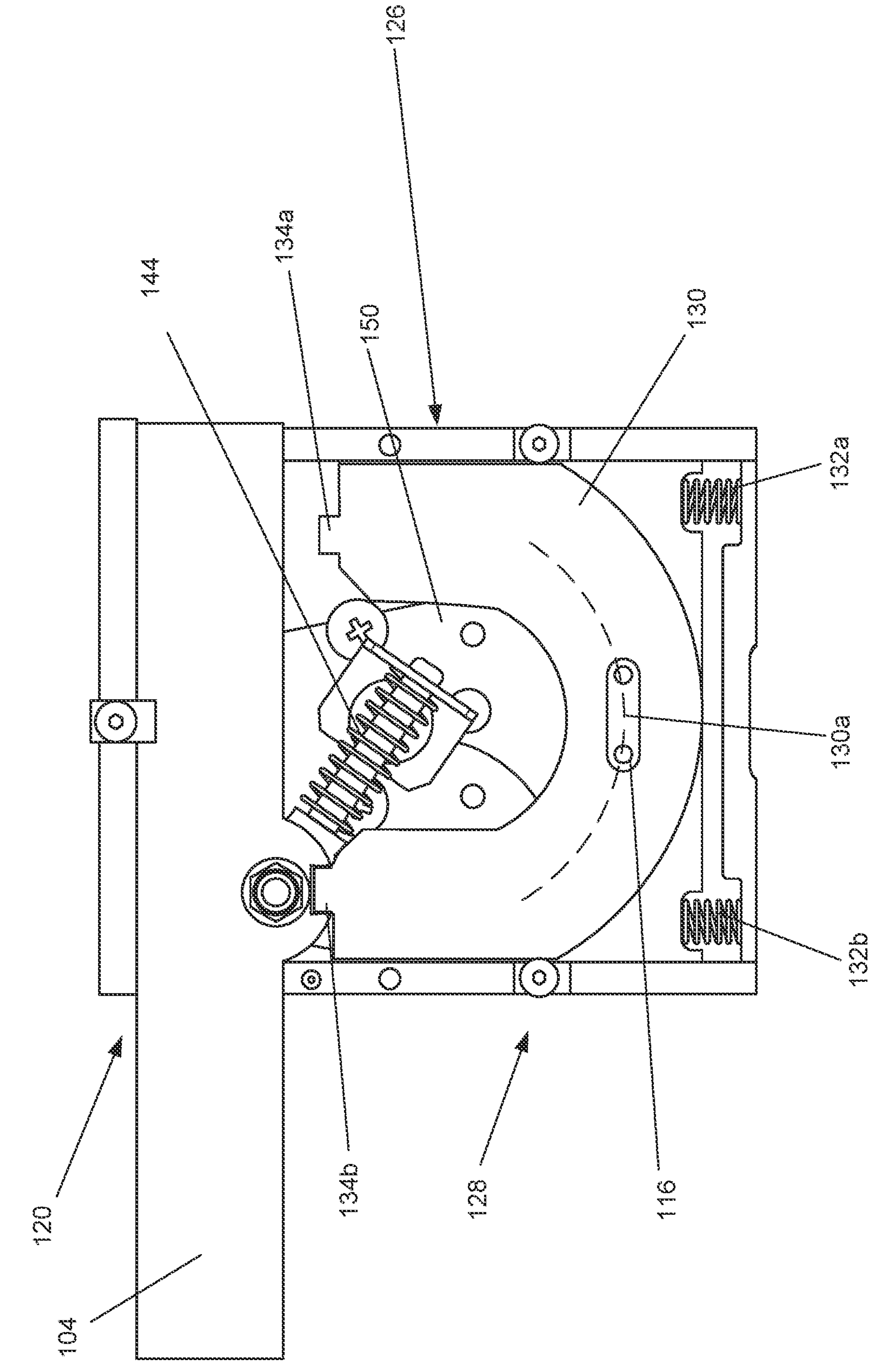
FIG. 14 is another front side perspective view of the latch of FIG. 9 with a housing cover removed and a bolt in the second position.

FIG. 14 shows the bolt 104 in the second position. The cam 150 is still engaged with the bolt locking assembly 130, thus keeping the bolt locking assembly 130 from interfacing with the bolt 104. The bolt 104 is not engaged with the bolt locking assembly 130. The bolt locking assembly springs 132*a*, 132*b* are biased in a disengaged position. The cam 150 is extended downwards engaged with the bolt locking assembly 130.

Once positioned in the second position, the bolt locking assembly 130 is moved to the engaged position by releasing the control 116 or stopping rotation of the key in the locking cylinder 140. When the bolt locking assembly 130 is in the engaged position, the notch 142 of the bolt 104 receives the second lock portion 134*b* to prevent longitudinal movement of the bolt 104 between the first and second positions.

Figure 15:
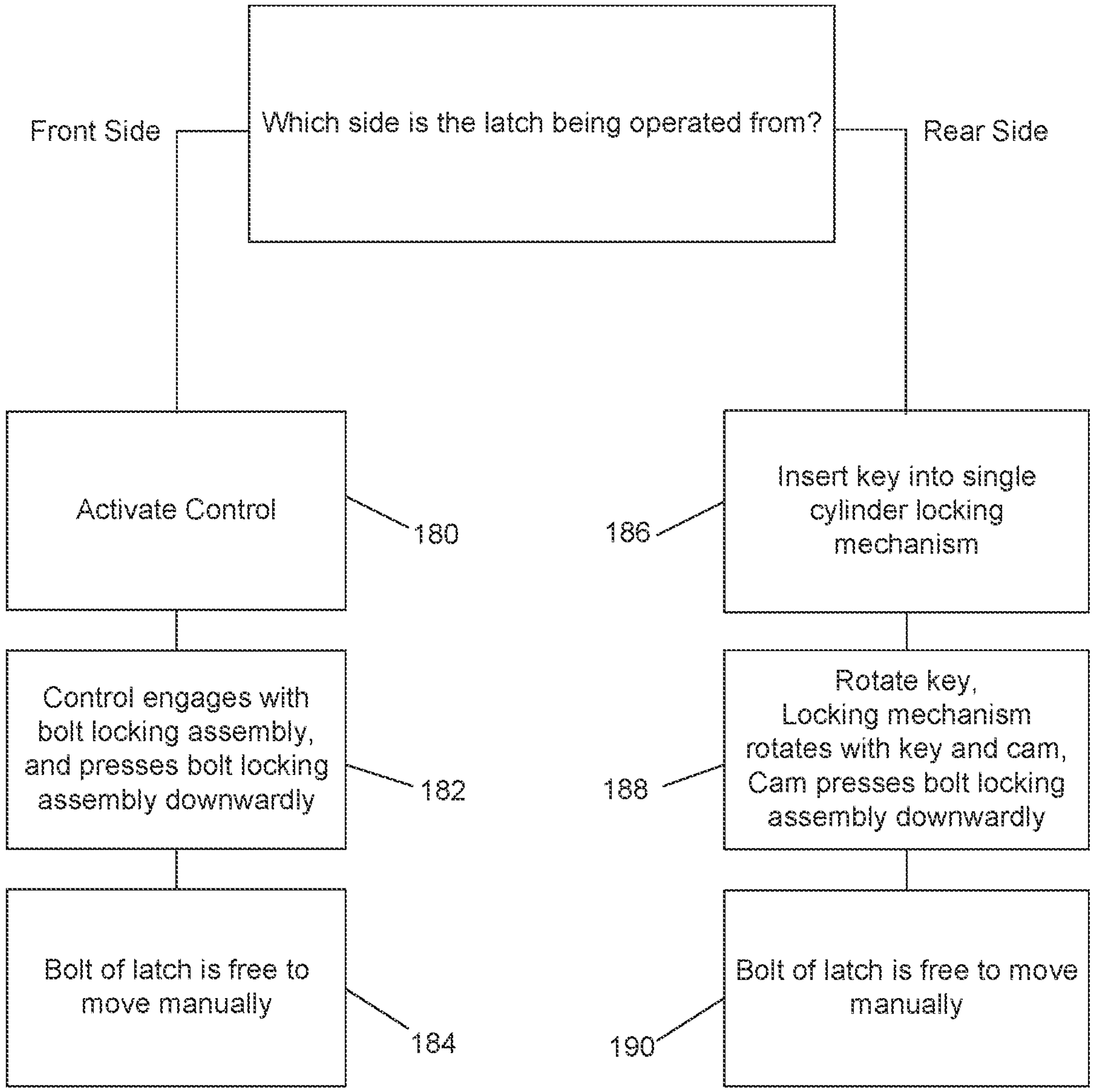
FIG. 15 is a flow chart of the operation of the latch in accordance with the principles of the present disclosure.

FIG. 15 generally outlines the movement of the latch 100, for example from the front side 120 or rear side 122.

When operating the latch 100 from the front side 120, the control 116 on the front side 120 of the latch 100 is activated at step 180. The control 116 then directly engages with the bolt locking assembly 130 moving the bolt locking assembly 130 to the disengaged position at step 182. The bolt locking assembly 130 then disengages from the bolt 104 and allows the bolt 104 to freely move at step 184. The bolt 104 can be manually driven between the first position and the second position. The bolt 104 is partially assisted after the midpoint.

When operating the latch 100 from the rear side 122, the key 146 is inserted into the locking cylinder mechanism 140 on the rear side 122 of the latch 100 at step 186. The cylinder locking mechanism is connected to the bolt locking assembly 130. The key 146 is then rotated which rotates the cylinder locking mechanism 140, causing the bolt locking assembly 130 to move and disengage from the bolt 104 at step 188. This allows the bolt 104 to freely move at step 190. This allows for manually driving the bolt 104 between the first position and the second position, the bolt 104 is partially assisted after the midpoint between the first position and the second position.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

I claim:

1. A latch comprising:

a housing having a first side and a second side;

a bolt assembly positioned at least partially within the housing, the bolt assembly including a bolt movable longitudinally within the housing between a first position and a second position;

a bolt locking assembly, wherein the bolt locking assembly has an engaged position and a disengaged position, wherein when in the engaged position, the bolt locking assembly interfaces with the bolt to prevent movement of the bolt between the first and second positions and, when in the disengaged position, the bolt locking assembly allows movement of the bolt, and wherein the bolt locking assembly is linearly movable relative to the housing between the engaged and disengaged positions and biased toward the engaged position by at least one bolt locking assembly spring;

a bolt spring in contact with the bolt, wherein the bolt spring biases the bolt toward at least one of the first position and the second position;

a bolt movement assembly, including:

a locking cylinder mechanism movable between a locked position and an unlocked position, the locking cylinder mechanism being connected to the bolt locking assembly, the locking cylinder mechanism being accessible from the first side of the housing;

a control connected to the bolt locking assembly, the control being accessible from the second side of the housing, wherein, when actuated, the control moves the bolt locking assembly between the engaged and disengaged positions;

a cam connected to the locking cylinder mechanism, the cam interfacing with an inner surface of the bolt locking assembly and configured to rotate with the locking cylinder mechanism, wherein when the cam engages with the inner surface of the bolt locking assembly, the cam moves the bolt locking assembly to the disengaged position by moving the bolt locking assembly against the bias of the at least one bolt locking assembly spring, and wherein, when the bolt locking assembly is disengaged from the bolt, the bolt is moved within the housing initially only by an external force between the first position and the second position, and wherein the movement of the bolt is partially assisted by the bolt spring toward one of the first or second positions of the bolt.

2. The latch of claim 1, further comprising a first handing configuration and a second handing configuration, wherein the first handing configuration corresponds to the first position of the bolt and the second handing configuration corresponds to the second position of the bolt.

3. The latch of claim 2, wherein changing between the first handing configuration and the second handing configuration requires moving the bolt locking assembly to the disengaged position and applying the external force to the bolt to move the bolt between the first and second positions.

4. The latch of claim 1, wherein the external force is force exerted by a hand of a user.

5. The latch of claim 1, further comprising a receiving mechanism mountable adjacent the housing, wherein the receiving mechanism is configured to receive the bolt.

6. The latch of claim 1, wherein the control is accessible from the first side of the housing.

7. The latch of claim 1, wherein the latch is mounted to a hinged barrier.

8. The latch of claim 7, wherein the hinged barrier is a gate.

9. The latch of claim 1, wherein the bolt includes a notch which interfaces with the bolt locking assembly.

10. The latch of claim 1, wherein the bolt locking assembly includes first and second lock portions that are configured to interface with the bolt.

11. The latch of claim 10, wherein the first and second lock portions extend upwardly and are configured to interface with a notch in the bolt.

12. The latch of claim 1, wherein the cam is symmetrical.

13. The latch of claim 1, wherein the movement of the bolt is partially assisted by the bolt spring at a midpoint between the first and second positions toward the first or second position that the bolt is moving toward.

14. A method of operating a latch comprising:

providing a latch including:

a bolt movable between a first position and a second position relative to a housing;

a locking cylinder mechanism movable between a locked position and an unlocked position, the locking cylinder mechanism being connected to the bolt, the locking cylinder mechanism having a keyhole;

a first handing configuration and a second handing configuration, wherein the first handing configuration corresponds to the first position of the bolt and the second handing configuration corresponds to the second position of the bolt;

mounting the latch to an interior side of a gate;

positioning the locking cylinder mechanism so that the keyhole is accessible from an exterior side of the gate;

mounting a receiving mechanism to a surface adjacent the latch, wherein the receiving mechanism is aligned with the bolt so that the receiving mechanism is configured to receive and retain the bolt when the locking cylinder mechanism is in the locked position; and choosing the first or second handing configuration of the bolt by applying an external force to the bolt to move the bolt longitudinally within the housing between the first and second positions so that the locked position of the locking cylinder mechanism positions the bolt within the receiving mechanism.

15. The method of claim 14, wherein the latch further includes a bolt locking assembly, wherein the bolt locking assembly has an engaged position and a disengaged position, wherein when in the engaged position, the bolt locking assembly interfaces with the bolt to prevent movement of the bolt between the first and second positions and, when in the disengaged position, the bolt locking assembly allows movement of the bolt, and wherein the bolt locking assembly is linearly movable relative to the housing between the engaged and disengaged positions and biased toward the engaged position by at least one bolt locking assembly spring.

16. The method of claim 15, wherein changing between the first handing configuration and the second handing configuration requires moving the bolt locking assembly to the disengaged position and applying the external force to the bolt to move the bolt between the first and second positions.

17. The method of claim 15, wherein the bolt locking assembly includes first and second lock portions that are configured to interface with the bolt.

18. The method of claim 17, wherein the first and second lock portions extend upwardly and are configured to interface with a notch in the bolt.

19. The method of claim 14, wherein when choosing the first or second handing configuration of the bolt, the bolt is maintained in the latch.

20. A latch comprising:

a housing having a first side and a second side;

a bolt assembly positioned at least partially within the housing, the bolt assembly including a bolt movable through the housing between a first position and a second position;

a bolt locking assembly, wherein the bolt locking assembly has an engaged position and a disengaged position, wherein when in the engaged position, the bolt locking assembly interfaces with the bolt to prevent movement of the bolt between the first and second positions and, when in the disengaged position, the bolt locking assembly allows movement of the bolt, and wherein the bolt locking assembly is linearly movable relative to the housing between the engaged and disengaged positions and biased toward the engaged position by at least one bolt locking assembly spring;

a bolt spring in contact with the bolt, wherein the bolt spring biases the bolt toward at least one of the first position and the second position;

a bolt movement assembly, including:

a locking cylinder mechanism movable between a locked position and an unlocked position, the locking cylinder mechanism being connected to the bolt locking assembly, the locking cylinder mechanism being accessible from the first side of the housing;

a control connected to the bolt locking assembly, the control being accessible from the second side of the housing, wherein, when actuated, the control moves the bolt locking assembly between the engaged and disengaged positions; and a cam connected to the locking cylinder mechanism, the cam interfacing with an inner surface of the bolt locking assembly and configured to rotate with the locking cylinder mechanism, wherein when the cam engages with the inner surface of the bolt locking assembly, the cam moves the bolt locking assembly to the disengaged position by moving the bolt locking assembly against the bias of the at least one bolt locking assembly spring, wherein, when the bolt locking assembly is disengaged from the bolt, the bolt is moved initially only by an external force between the first position and the second position without removing the bolt from the housing, and wherein the movement of the bolt is partially assisted by the bolt spring toward one of the first or second positions of the bolt.

* * * * *